Nov. 6, 1956  H. B. BARRETT  2,769,241
BRAKE DRUM GAUGES

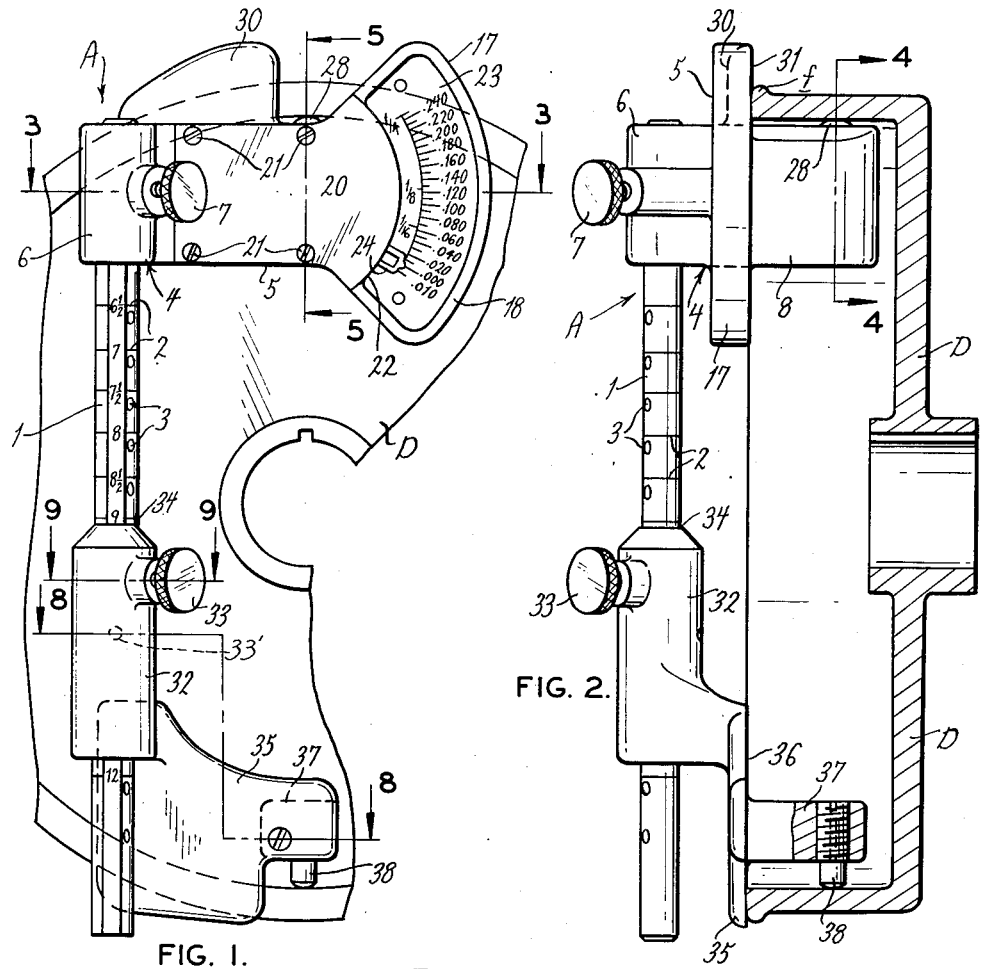
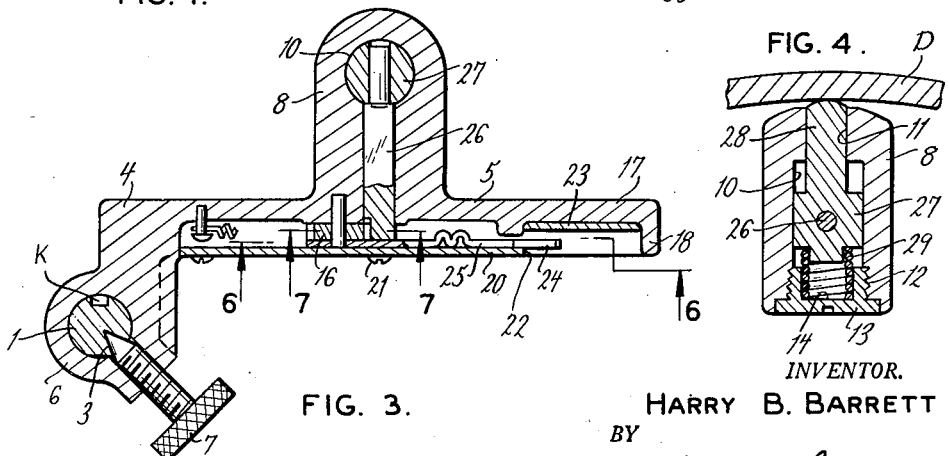
Fig. 1. Fig. 2. Fig. 3. Fig. 4.
INVENTOR.
HARRY B. BARRETT

Filed May 22, 1953  2 Sheets-Sheet 2

INVENTOR.
HARRY B. BARRETT
BY
ATTORNEY

United States Patent Office 2,769,241
Patented Nov. 6, 1956

2,769,241

BRAKE DRUM GAUGES

Harry B. Barrett, St. Louis, Mo.

Application May 22, 1953, Serial No. 356,823

3 Claims. (Cl. 33—147)

This invention relates in general to certain new and useful improvements in tools and equipment for repairing and maintaining vehicular brakes and, more particularly, to a brake drum gauge.

It is the primary object of the present invention to provide a gauge for accurately measuring the internal diametral size of brake drums of the type ordinarily used in automotive vehicles.

It is another object of the present invention to provide a brake drum gauge of the type stated which is simple and economical in construction, but is nevertheless highly accurate and can be read directly in terms of the amount by which the brake drum is either oversized or undersized with respect to a predetermined optimum dimension.

It is a further object of the present invention to provide a brake drum gauge of the type stated which can be readily set for guaging various different brake drums in the complete range of sizes ordinarily encountered in automobile and truck construction.

It is an additional object of the present invention to provide a brake drum gauge of the type stated which can be employed directly in the brake drum while it is on the wheel or while it is on the turning lathe, the gauge being adapted to straddle the axle spindle or mandrel of the lathe as the case may be, so that the brake drum may be measured without removal, but instead can be measured "in situ," so to speak.

With the above and other objects in view, my invention resides in the novel features of form, construction, arrangement, and combination of parts presently described and pointed out in the claims.

In the accompanying drawings (two sheets)—

Figure 1 is a front elevational view of a brake drum gauge constructed in accordance with and embodying the present invention;

Figure 2 is a side elevational view showing the gauge in operative position within a brake drum;

Figure 3 is a fragmentary sectional view taken along line 3—3 of Figure 1;

Figure 4 is a fragmentary sectional view taken along line 4—4 of Figure 2;

Figure 5:
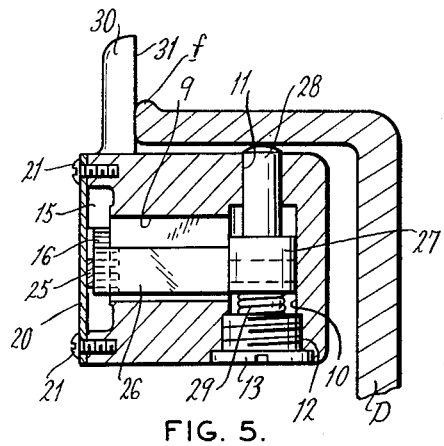
Figure 5 is a fragmentary sectional view taken along line 5—5 of Figure 1.
Figure 6:
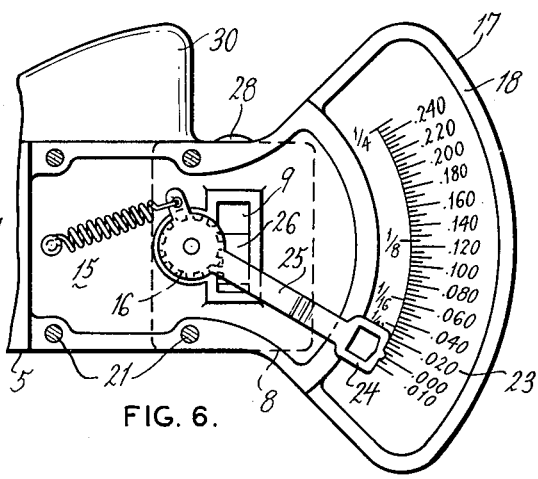
Figure 8:
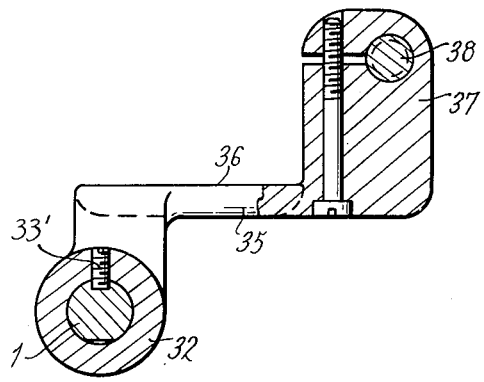
Figure 7:
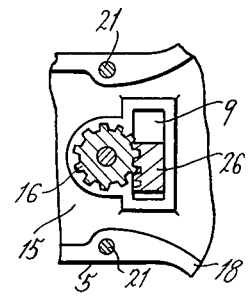
Figure 9:
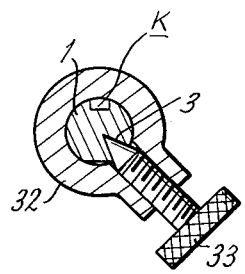

Figures 6 and 7 are fragmentary sectional views taken along lines 6—6 and 7—7, respectively, of Figure 3; and Figures 8 and 9 are fragmentary sectional views taken along lines 8—8 and 9—9, respectively, of Figure 1.

Referring now in more detail and by reference characters to the drawings, which illustrate a preferred embodiment of the present invention, A designates a brake drum gauge comprising a heavy steel rod 1 having a precisely machined series of annular graduations 2, each of which is associated with a corresponding circular indentation 3. Provided for removable disposition upon one end of the rod 1 is a gauge-head 4 integrally including an oblong rectangular body portion 5 and a tubular sleeve 6 adapted to fit snugly upon the rod 1 and being threadedly provided with a large set screw 7 by which the gauge-head 4 is securely and rigidly attached to the rod 1. It should be noted in this connection that the inner end of the set screw is turned down to a conical point for precisely positioned seated engagement in the endmost one of the recesses 3, so that the gauge-head 4 will have a precise measure relationship to the graduations 2 along the rod 1.

Formed integrally with and extending rearwardly from the body portion 5 is a rectangular boss 8 having an internal chamber 9 opening at its rear end to the central portion of a bore 10 extending through the boss 8 and having its longitudinal axis in rearwardly spaced parallel relation to the longitudinal axis of the rod 1. The bore 10 is counter-bored at one end in the provision of a diametrically reduced coaxial slide-bore 11 and at its other end with a diametrically enlarged end-recess 12 which is internally threaded for receiving a threaded closure plug 13 provided in its interior face with a shallow circular socket-forming recess 14. At its forward end, the chamber 9 opens upon the forwardly presented face of the body member 5 and is milled out along one lateral margin in the provision of a flat, inwardly relieved, somewhat semi-circular recess 15 for accommodating a small spur-gear or pinion 16 which is operatively journaled in the flat bottom wall thereof. The body member 5 is, furthermore, integrally provided at its outer end with a somewhat triangularly shaped extension portion 17 having an arcuate outer margin which conforms to a circular arc having its radius approximately centered at the pivot point of the gear 16. Finally, the body member 5 is provided around its entire periphery with an upstanding marginal rim 18, upon which a suitable cover plate 20 is mounted by a series of small short mounting screws 21, the cover plate 20 being provided in its outer end with an arcuately shaped window opening 22 and suitably mounted upon the forwardly presented face of the extension portion 17 is an arcuate graduation plate 23, which is marked or inscribed with a series of graduations, all of which are along radial lines with respect to the pivot point of the gear 16 and preferably ranging in ascending order from a zero point located at one end of the scale with preferably one or two graduations on the opposite side of the zero point for respectively indicating oversize and undersize measurements. The plate 23 is spaced rearwardly from the window opening 22 to afford clearance for an arcuately swinging pointer 24 formed integrally on the outer end of an indicator needle 25 rigidly attached at its inner end to, and movable with, the gear 16, all as best seen in Figure 6.

Shiftably mounted in the chamber 9 for meshing engagement with the rear 16 is a rack bar 26 fixed at its rear end in a cylindrical plunger-barrel 27 which is, in turn, slidably mounted in the bore 10 and integrally provided on its upper end with an axially extending gauging stud or so-called contact pin 28, projecting slidably through the slide-bore 11. On its opposite end the plunger-barrel 27 is seated against one end of a compression spring 29 which is, in turn, seated at its other end in the recess 14 for normally urging the plunger-barrel 27 upwardly to the upper limit of its movement.

The body member 5 is also integrally provided with an outwardly and rearwardly projecting extension flange 30 having a rearwardly presented flat abutment face 31, all as best seen in Figure 2 and for purposes presently more fully appearing.

Adjustably mounted upon the lower end of the rod 1 is a tubular sleeve 32 having a set screw 33 extending radially therethrough and being suitably turned down at its inner end to a conical point for precise seated engagement in any selected one of the recesses 3. The sleeve 32 is also provided with a fixed set-screw 33' which rides in a keyway $k$ milled axially in the face of the rod 1 so that as the sleeve 32 is shifted up and down on the rod 1 it will always remain in proper alignment with the sleeve 6. At its inner end, the sleeve 32 is provided with a tapered index margin 34 which bears a precise distance-relationship to the center line of the set screw 33. Thus, when the index margin 34 of the sleeve 32 is manually aligned with a selected graduation 2 and the set screw 33 is screwed inwardly, the pointed end thereof will seat itself in the recess 3, associated with that graduation 2, and draw the sleeve 32 precisely into a predetermined distance-relationship to the gauge-head 4 as designated by such selected graduation 2. At its lower end, the sleeve 32 is provided with an outwardly and rearwardly offset plate portion 35 having a rearwardly presented flat abutment face 36 and a rearwardly projecting arm portion 37 which is, in turn, provided with a threadedly adjustable contact-stud or so-called reference member 38, the latter preferably being substantially in axial alignment with the center line or axis of the plunger-barrel 27. The reference member 38 is adjusted so that its outer end face will be located at different precisely measured positions in relation to the end face of the contact pin 28 when the pointer 24 is aligned with the "zero" graduation of the scale plate 23. The set screw 33 may be located in optional engagement with any one of the recesses 3 depending upon which one of said measured positions is desired. Thus, when the gauge A is inserted in a brake drum D with the abutment faces 31, 36, against the flange $f$ thereof, the end face of the reference member 38 will contact one point upon the inner face of the brake drum D and the outer end of the contact pin 28 will similarly contact a point diametrically opposite thereto. In so doing, the contact pin 28 will be shifted inwardly against the bias of the spring 29 and the pointer 24 of the needle 25 will precisely register with the "zero" graduation on the scale plate 23 if the drum D has the exact internal diameter conforming to the particular graduation 2 at which the sleeve 32 is set. It will, of course, be obvious in this connection that if the drum D is either undersized or oversized, the pointer 24 will actually indicate the amount of oversize or undersize in thousandths of an inch.

As has been above pointed out, automative brake drums are made in a series of standard sizes usually ranging from six inches to eighteen and a quarter inches in internal diameter. The graduations 2 conform to these various standard sizes; thus, if the particular brake drum being measured is a nine and one-half inch drum, the sleeve 32 is set at a point along the rod so that the index margin 34 conforms to the particular graduation 2 representing a drum of such size and the set screw 33 is fastened in place. Since the set screw 33 has a conical end which fits precisely into the recesses 3, the set screw itself will pull the sleeve into precise setting even though the user is not precisely accurate in aligning the index margin 34 with the selected graduation 2. In this connection, it should be pointed out that the rod 1 may be made long enough to accommodate the entire desired range of adjustment or, if desired, it is also possible, for convenience sake, to use a short rod for small sizes and a long rod for the large sizes, so that the range of adjustment is covered by different rods. This, of course, can be readily accomplished inasmuch as the gauge head 4 is readily detachable from the rod 1, so that it can be interchanged with several different rods if desired.

It should be understood that changes and modifications in the form, construction, arrangement, and combination of the several parts of the brake drum gauge may be made and substituted for those herein shown and described without departing from the nature and principle of my invention.

Having thus described my invention, what I claim and desire to secure by Letters Patent is:

1. A brake drum gauge comprising a rod provided on one end with a slidable tubular sleeve having a laterally projecting head member which is offset rearwardly from the rod and is provided with an internal recess, a shiftable contact pin operatively mounted in the recess in laterally spaced parallel relation to the rod, means operably connected to the contact pin for rocking-movement in direct response to the shifting movement of the pin, a needle operably associated with said means, and a second tubular sleeve slidably mounted on the other end of the rod and having a laterally projecting auxiliary member which is rearwardly offset with respect to the rod, said auxiliary member having a reference member disposed in axial alignment with the contact pin, said tubular sleeves both being provided with means for locking them in fixed relative positions on the rod so that the reference member will be positioned at a predetermined distance from the contact pin.

2. A brake drum gauge comprising a rod provided on one end with a slidable tubular sleeve having a laterally projecting head member which is offset rearwardly from the rod and is provided with an internal recess, a shiftable contact pin operatively mounted in the recess in laterally spaced parallel relation to the rod, means operably connected to the contact pin for rocking movement in direct response to the shifting movement of the pin, a needle operably associaed with said means, and a second tubular sleeve slidably mounted on the other end of the rod and having a laterally projecting auxiliary member offset rearwardly with respect to the rod, said auxiliary member having a reference member disposed in axial alignment with the contact pin, said tubular sleeves both being provided with means for locking them in fixed relative positions on the rod so that the reference member will be positioned at a predetermined distance from the contact pin.

3. A brake drum gauge comprising a rod provided on one end with a slidable tubular sleeve having a laterally projecting head member which is offset rearwardly from the rod and is provided with an internal recess, a shiftable contact pin operatively mounted in the recess in laterally spaced parallel relation to the rod and a rearwardly presented contact face, means operably connected to the contact pin for rocking movement in direct response to the shifting movement of the pin, a needle operably associated with said means, and a second tubular sleeve slidably mounted on the other end of the rod and having a laterally projecting auxiliary member provided with a rearwardly presented contact face co-planar with the first named contact face, said auxiliary member being provided with a portion which is rearwardly offset with respect to the rod, said portion having a reference member disposed in axial alignment with the contact pin, said tubular sleeves both being provided with means for locking them in fixed relative position on the rod so that the reference member will be positioned at a predetermined distance from the contact pin.

References Cited in the file of this patent
UNITED STATES PATENTS

| 23,564 | Gould | Apr. 12, 1859 |
| 2,524,256 | Greany | Oct. 3, 1950 |
| 2,648,134 | Billeter | Aug. 11, 1953 |